United States Patent
Zueger et al.

(10) Patent No.: US 6,411,479 B1
(45) Date of Patent: Jun. 25, 2002

(54) ARRANGEMENT FOR CURRENT LIMITING USING A SUPERCONDUCTOR TRANSFORMER

(75) Inventors: Harry Zueger, Geneva (CH); Dietrich Bonmann, Meckenheim (DE); Willi Paul, Wettingen (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/564,541

(22) Filed: May 4, 2000

(30) Foreign Application Priority Data

May 4, 1999 (DE) .......................................... 199 20 443

(51) Int. Cl.[7] .............................................. H02H 7/00
(52) U.S. Cl. .......................................... 361/19; 361/58
(58) Field of Search .............................. 361/19, 35, 38, 361/58, 141; 335/216; 336/DIG. 1

(56) References Cited

U.S. PATENT DOCUMENTS 4,336,561 A   6/1982   Murphy ........................ 361/19

FOREIGN PATENT DOCUMENTS

| DE | 4418050 A1 | 1/1995 | ........... H01B/12/02 |
| DE | 19524579 A1 | 1/1997 | ........... H01F/36/00 |
| DE | 19809314 A1 | 9/1999 | ........... H01F/36/00 |
| GB | 1 230 579 | 5/1971 | ........... H01F/27/00 |

OTHER PUBLICATIONS

German Patent Office Search Report dated Dec. 16, 1999.

P. Tixador, J. Lévêque, Y. Brunet and V.D. Pham, "Hybid AC Superconducting Current Limiter: Small–Scale Experimental Model", IEE Proceedings—C Generation, Transmission and Distribution, vol. 141, No. 2, Mar. 1994, pp. 117–124.

Primary Examiner—Ronald W. Leja
(74) Attorney, Agent, or Firm—Burns, Doane, Swecker & Mathis, L.L.P.

(57) ABSTRACT

In a current limiting arrangement based on a superconducting transformer (30), a load (21) can be supplied with power without any interruption by providing an auxiliary winding (14) in parallel with the superconducting primary winding (12) of the transformer (30). This auxiliary winding (14) carries the excess current in the event of a short circuit and allows the superconducting primary winding (12), which has been heated due to the current limiting, to cool down. Once the short circuit has been cleared, the latter winding can once again carry the rated current, without any losses, immediately. The auxiliary winding (14) is composed of a normally conductive material and has an additional stray impedance.

8 Claims, 2 Drawing Sheets

ARRANGEMENT FOR CURRENT LIMITING USING A SUPERCONDUCTOR TRANSFORMER

BACKGROUND OF THE INVENTION

1. Field of the Invention

The present invention relates to the field of engineering use of superconductors. It relates to an arrangement and a method for current limiting using a superconducting transformer.

2. Description of Related Art

In a superconducting current limiter which is designed, for example, for an electrical current distribution network, use is made of the fact that a superconductor which is cooled to a temperature below the critical temperature $T_c$ maintains its superconducting capability only for as long as the current density of a current flowing through it remains below a certain limit value. This limit value is normally referred to as the critical current density $j_c$ or, related to a specific conductor cross section, as the critical current level $I_c$, and is in principle dependent on the temperature of the superconductor, and on the magnetic field passing through it. If the current level in the conductor exceeds the critical value $I_c$ in the event of a short circuit, its electrical resistance increases, and the short-circuit current is limited. In DE 44 18 050 A1, this is done using an induction coil, whose impedance rises suddenly since its iron core is no longer shielded.

One major requirement for current limiters of any type in electrical power distribution networks is that they limit a short-circuit current to a safe level, and immediately carry the related current again once the short circuit is no longer present. In particular, it should not be necessary to interrupt the circuit, so that a load which is protected by the same current limiter as the short-circuit path is not entirely disconnected from the power source.

If a superconductor is loaded with an excessive current for too long, it is heated to well above the critical temperature $T_c$ and, in some circumstances, may be damaged. A current limiter heated in such a way also still has a considerable resistance when it now has to carry only the rated current again once the short circuit has been rectified. The subsequent cooling-down process to a temperature below the critical temperature $T_c$ lasts for a certain minimum time owing to the physically predetermined limits relating to the heat transmission between the superconductor and the cooling medium. This is often longer than the duration of the actual short circuit, so that the power supply to the load is interrupted, or at least limited, for much longer than is necessary.

In a current limiter based on superconductors, it is thus necessary to protect against thermally overloading that superconducting section which carries the rated current without any losses during normal operation. A parallel-connecting auxiliary path is suitable for this purpose, which contributes little or nothing to carrying the current during normal operation, but helps to carry the short-circuit current.

If a superconducting transformer is provided in an otherwise normally conductive circuit, this makes it possible to equip this transformer with a current-limiting characteristic as well. U.S. Pat. No. 4,336,561 discloses such a transformer, in which parallel-connected main and auxiliary windings are provided on both the primary and secondary. The main windings are designed such that they carry the rated current, without any resistive losses, during continuous operation. The two auxiliary windings, which are designed as load-reducing elements, are not perfectly coupled, that is to say they are distinguished by a substantial stray impedance, similar to that of a free-standing induction coil. For this reason, virtually no current flows through the auxiliary windings during continuous operation. If the rated current is now exceeded in the event of a short circuit, both the primary and auxiliary main windings change to a resistive state, and the current flow is at least partially commutated onto the auxiliary windings. Their stray impedance now prevents an unlimited current rise. A switch can interrupt the main windings in the event of a short circuit, in order to protect them against overloading. The auxiliary windings are designed such that they remain superconducting in all circumstances, that is to say their conducting cross section is designed on the basis of a multiple of the rated current. This involves considerable cost for superconducting material, particularly for the primary auxiliary windings.

SUMMARY OF THE INVENTION

The essence of the invention, in the case of a superconducting transformer, is to provide an auxiliary path, in parallel with a first superconducting primary or secondary winding, in the form of a second, normally conductive primary or secondary winding, respectively. Owing to the resistance of the normal conductor, virtually no current flows through this auxiliary or load-reducing winding during normal operation. However, if the current in the first winding exceeds the critical value in the event of a short circuit, then an electrical resistance likewise builds up there, and the alternative, normally conductive path through the second winding carries a portion of the short-circuit current.

A first exemplary embodiment of the invention is distinguished in that the first, superconducting winding is designed such that its critically current level $I_c$ essentially coincides with the rated current $I_N$ that has to be carried on the primary side or secondary side, respectively, during normal operation.

In a second exemplary embodiment, the auxiliary winding according to the invention is located either on the primary side or secondary side, and only a first, superconducting winding is provided on the opposite secondary or primary side, respectively. This first, superconducting winding is designed such that it remains superconducting even in the event of a short circuit, that is to say it can carry several times its rated current $I_N$.

In order to increase the impedance of the second, normally conductive auxiliary winding, this winding is provided with an inductive component, in a further exemplary embodiment. For this purpose, the second winding is wound such that a minimum distance between it and the opposite secondary or primary winding results in an additional stray inductance.

In a further exemplary embodiment, a switch is provided in series with the first, superconducting winding, which switch is opened shortly after a short circuit occurs, and interrupts the current through the superconducting winding. The latter is thus optimally protected, is heated only insignificantly, and can be reconnected to the circuit immediately once the short circuit is no longer present.

BRIEF DESCRIPTION OF THE DRAWINGS

The invention will be explained in more detail in the following text with reference to exemplary embodiments and in conjunction with the drawings, wherein.

The reference symbols used in the drawings are summarized in the list of reference symbols. In principle, identical parts are provided with the same reference symbols.

DETAILED DESCRIPTION OF THE INVENTION

To assist legibility, the auxiliary winding according to the invention is arbitrarily considered in the following text as being on the side of the superconducting transformer referred to as the primary side. As will be explained further below, this does not represent any limitation to the present subject matter.

Figure 1:
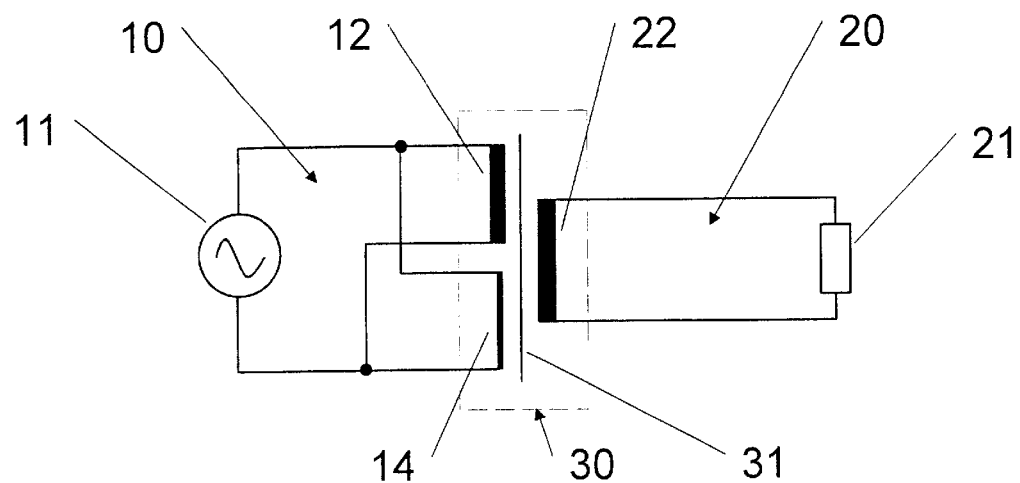
FIG. 1 shows a circuit having a superconducting transformer, according to a first exemplary embodiment of the invention.

FIG. 1 shows a sketch of a circuit which includes a primary circuit 10 having an alternating current source 11, a secondary circuit 20 having a load 21, and a transformer 30 arranged between the primary circuit and the secondary circuit and having a transformer core 31. During normal operation, the source 11 produces a primary rated current $I_N(P)$, while a secondary rated current $I_N(S)$ flows through the load 21. Transformer 30 has a first superconducting primary winding 12, which carries the primary rated current $I_N(P)$ without any losses. A second, normally conductive primary winding 14 is provided, as an auxiliary winding, in parallel with the first primary winding 12. Both primary windings 12, 14 are interactively connected via the transformer core 31 to a secondary winding 22 of the transformer 30.

Figure 2:
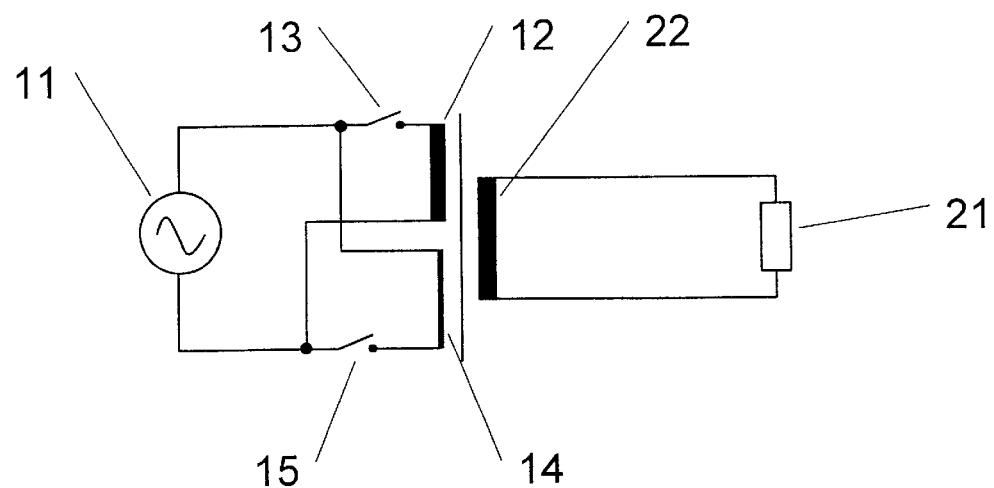
FIG. 2 shows a circuit having a superconducting transformer, according to a second exemplary embodiment of the invention.

FIG. 2 shows a design variant in which a first switch 13 is provided in series with the first primary winding 12. This switch 13 allows the first primary winding 12 to be disconnected from the primary circuit 10. Independently of the existence of the first switch, a second switch 15 may also be fitted in series with the second primary winding 14.

Figure 3:
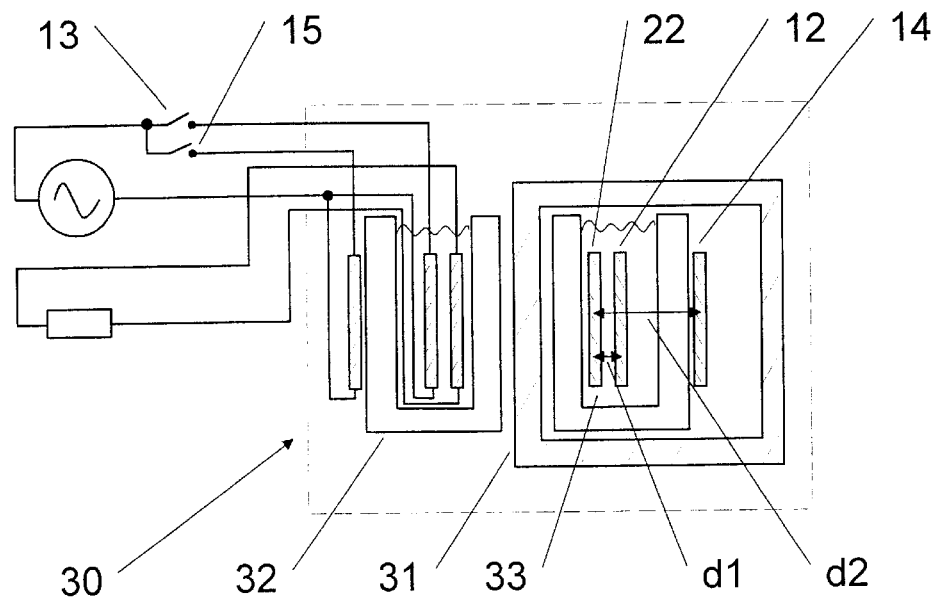
FIG. 3 shows a schematic illustration of the arrangement shown in FIG. 2, showing a section through the superconducting transformer.

FIG. 3 shows, schematically, the design variant shown in FIG. 2, showing a section through the transformer 30. All the windings 12, 14, 22 are wound concentrically around a common axis, which is identical to the transformer core 31. The superconducting first primary winding 12 and the superconducting secondary winding 22 are located in a cryostat 32 filled with a cooling medium 33, and are at a radial distance d1. The second primary winding 14 is located outside the cryostat 32, in the same way as the two switches 13, 15. The radial distance between the second primary winding 14 and the secondary winding 22 is denoted by d2.

Figure 4:
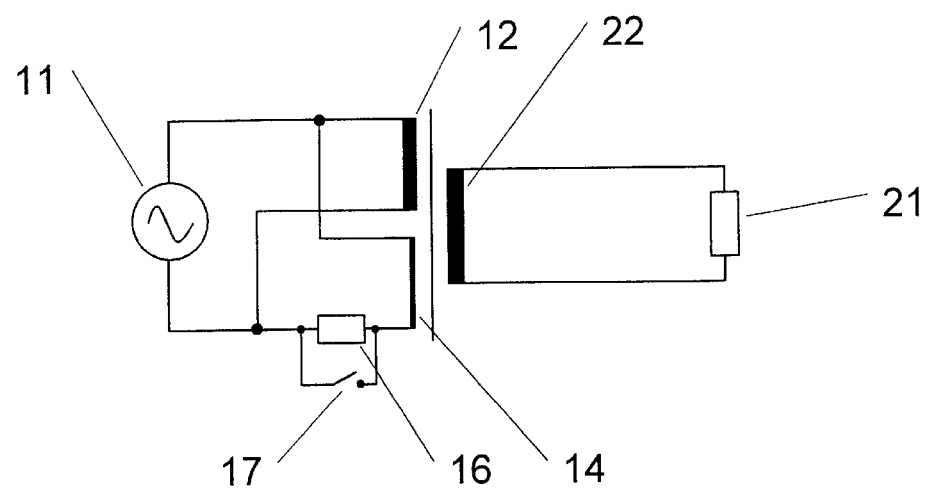
FIG. 4 shows a circuit having a superconducting transformer, according to a third exemplary embodiment of the invention.

FIG. 4 shows a further design variant, in which a parallel circuit comprising a damping impedance 16, preferably a resistor, and a third switch 17 are connected in series with the auxiliary winding 14. The third switch 17 bridges the impedance 16 when closed, and may be identical to the second switch 15, mentioned above.

During normal operation, the first superconducting primary winding 12 is connected to the current source 11. If a short circuit now occurs in the secondary circuit 20, the current level in both the primary and secondary sides rises severely and exceeds the critical current level $I_c(P)$ in the first primary winding 12. A more than proportional voltage drop occurs, and the primary winding 12 changes to the normally conductive state. At the same time, the impedance of the parallel-connected, normally conductive second primary winding 14 remains unchanged, of course, so that the short-circuit current or overcurrent is now commutated from the first primary winding to the second primary winding.

The switch 13 in series with the first primary winding 12 according to the embodiment shown in FIG. 2 further assists the desired reduction in load.

As soon as the first overcurrent spike has been limited by the superconductor, this superconductor is disconnected from the source 11. This is preferably done at a zero crossing of the overcurrent element flowing through the switch 13. The earliest possible time thus occurs at the latest after one half cycle, but it is appropriate to wait somewhat longer, and to interrupt the overcurrent through the first primary winding 12 after, for example, 20–100 ms (for a mains frequency of 50–60 Hz). The first primary winding 12 thus has sufficient time to cool down again before the short circuit is rectified, normally after several 100 ms.

The second primary winding 14 normally has a high resistance and is wound, for example, from a steel wire. However, a copper or aluminum wire, whose conductivity is very high particularly at low temperatures, may also be chosen. However, in this case, in order to prevent the overcurrent through the second primary winding 14 rising excessively in the event of a short circuit, this second primary winding 14 must be provided with an additional stray impedance. To achieve this, the turns of the second primary winding 14 are wound at a certain distance d2 from the turns of the secondary winding 22. The corresponding air gap ensures the desired inductive impedance, and even allows the second primary winding 14 to be fitted outside the cryostat 32, as shown in FIG. 3. The critical factor for the design of the two primary windings 12, 14 is the ratio of the total impedance of the second winding 14 to the resistance of the first winding 12 in the normally conductive state, that is to say once the first overcurrent spike has been limited.

In contrast to this, the coupling between the two superconducting windings 12, 22 should be as good as possible, in order to keep the stray losses low during normal operation. The radial distance d1 between them should therefore be chosen to be as small as possible, taking account of the generally applicable isolation requirements. The second switch 15 shown in FIG. 2 is also used for this purpose, this switch being fitted in the auxiliary path 14 and having the capability to disconnect this auxiliary path 14 from the source 11 during normal operation, and to connect when a fault occurs.

The additional damping impedance 16 provided in series with the auxiliary winding 14 in FIG. 4 is responsible for rapid damping of any possible aperiodic short-circuit current. The impedance 16 can be bridged once again after a short time, as appropriate, for example within the second alternating-current cycle (that is to say 20–40 ms for a mains frequency of 50 Hz) after the short circuit occurs by closing the third switch 17.

For superconducting windings, a wire, for example, can be used containing a significant proportion of a superconducting phase in a matrix that acts as an electrical bypass and is composed of material that is not superconducting. The critical current level in this wire is influenced by the wire cross section or the content of superconducting material. In this case, it must be remembered that the alternating-current losses are proportional to the volume of the relevant superconductor. From this viewpoint as well, it is thus advantageous to design the wire so that the rated current $I_N$ corresponds approximately to the critical current $I_c$. This is the case for the primary winding 12 in the illustrated transformer 30.

If only one winding is provided on the secondary, then this may not itself also have a current-limiting function since it could otherwise likewise become hot and would have to be protected by corresponding precautions, analogous to those on the primary. This wire thus has a high proportion of superconducting material, or its matrix is designed such that it can temporarily carry an overcurrent without itself, or the superconducting phase, being damaged. A silver matrix is suitable for this purpose.

As described initially, the designation chosen for the primary and secondary circuits 10, 20 is not governed by the source 11 or the load 21, respectively. A person skilled in the art is, of course, free to use the measures characterizing the invention on the secondary side, that is to say to interchange the primary and secondary designations chosen here. It is also possible to provide the current-limiting mechanism, together with the auxiliary windings, on both sides of the transformer. The auxiliary winding is advantageously designed at least on the transformer side having the greater rated current, and this corresponds to the statements that have already been made, on the assumption that the transformer transforms the voltage upward or, in other words, that the primary rated current $I_N(P)$ is greater than the secondary rated current $I_N(S)$. In a corresponding way, the greatest material savings are obtained if the superconducting primary winding 12 is designed for the rated current $I_N(P)$, for the purpose of current limiting and reducing the alternating-current losses, and with the lesser rated and short-circuit currents on the secondary side being designed generously. Specifically, suitable materials are high-temperature superconductors which can be cooled to a temperature below their critical temperature $T_c$ using liquid nitrogen as the cooling medium 33.

Overall, the use of a normally conductive auxiliary winding 14 according to the invention results in a current-limiting superconducting transformer 30 which allows a load 21 to be supplied with power without any interruptions. Excessive heating of the superconductor 12 by a short-circuit current that is to be limited is avoided, so that the superconductor is immediately ready to operate again once the defect has been corrected.

Reference symbols shown in FIGS. 1–4 include the following:
10 Primary circuit
11 alternating current source
12 First, superconducting primary winding
13 First switch
14 Second, normally conductive primary winding
15 Second switch
16 Damping impedance
17 Third switch
20 Secondary circuit
21 Load
22 Superconducting secondary winding
30 Transformer
31 Transformer core
32 Cryostat
33 Cooling medium The present invention has been described with reference to exemplary embodiments. However, it will be readily apparent to those skilled in the art that it is possible to embody the invention in specific forms other than those described above without departing from the spirit of the invention. The various aspects and exemplary embodiments are illustrative, and they should not be considered restrictive in any way. The scope of the invention is given by the appended claims, rather than the preceding description, and all variations and equivalents thereof which fall within the range of the claims are intended to be embraced therein.

What is claimed is:

1. An arrangement for current limiting, comprising;

a transformer having a superconducting primary winding, a superconducting secondary winding and an auxiliary winding composed of a normally conductive material in parallel with the superconducting primary winding, wherein the superconducting primary winding has a critical current level $I_C(P)$, which essentially corresponds to a rated current $I_N(P)$ on the primary side of the transformer, and wherein the superconducting secondary winding has a critical current level $I_C(S)$, which is greater than a rated current $I_N(S)$ on the secondary side of the transformer; and wherein no further secondary windings are provided.

2. The arrangement as claimed in claim 1, wherein a) the primary winding is arranged at a first radial distance d1 from, and concentrically with respect to, the secondary winding, and b) the auxiliary winding is arranged at a second radial distance d2, and concentrically with respect to, the secondary winding, and c) the second radial distance d2 is greater than the first radial distance d1.

3. The arrangement as claimed in claim 2, further comprising a cryostat having a cooling medium for cooling the superconducting primary winding and the superconducting secondary winding, wherein the auxiliary winding is arranged outside the cryostat.

4. The arrangement as claimed in claim 1, further comprising a first switch arranged to interrupt the superconducting primary winding.

5. The arrangement as claimed in claim 4, further comprising a second switch arranged to interrupt the auxiliary winding.

6. The arrangement as claimed in claim 1, further comprising a parallel circuit including a damping impedance and a third switch in series with the auxiliary winding.

7. A method for current limiting using an arrangement, the arrangement comprising a) a transformer having a normally conductive auxiliary winding and a superconducting primary winding and a superconducting secondary winding and b) a first switch, wherein the normally conductive auxiliary winding is in parallel with the first switch and one of the superconducting primary winding and the superconducting secondary winding, the method comprising the step of:

opening the first switch at a zero crossing of current flowing through the first switch, after a short circuit occurs and the entire primary current is commutated to the auxiliary winding.

8. The method as claimed in claim 7, wherein the first switch is opened within 1 to 5 alternating-current cycles after the short circuit occurs.

* * * * *